United States Patent [19]

Galle, Jr. et al.

[11] Patent Number: 4,491,351

[45] Date of Patent: Jan. 1, 1985

[54] HELICAL COIL STAB-IN CONNECTOR

[75] Inventors: Edward M. Galle, Jr.; William S. Cowan, both of Houston, Tex.

[73] Assignee: Armco Inc., Middletown, Ohio

[21] Appl. No.: 347,069

[22] Filed: Feb. 8, 1982

[51] Int. Cl.³ .............................................. F16L 39/00
[52] U.S. Cl. .................................................... 285/318
[58] Field of Search ....................... 285/318, 321, 141; 166/214

[56] References Cited

U.S. PATENT DOCUMENTS

| | | |
|---|---|---|
| 738,503 | 9/1903 | Waters . |
| 1,464,386 | 8/1923 | Ingram . |
| 1,820,644 | 8/1931 | Bach . |
| 1,891,460 | 12/1932 | Vlahek . |
| 2,346,051 | 4/1944 | Seamark ............................... 235/193 |
| 2,665,931 | 1/1954 | Vegren ................................. 287/119 |
| 2,777,718 | 1/1957 | Vegren ................................. 287/119 |
| 3,060,787 | 10/1962 | Kraüs et al. ............................ 85/33 |
| 3,105,556 | 10/1963 | Raulins ................................ 166/214 |
| 4,003,401 | 1/1977 | Häring ............................... 137/599.2 |

Primary Examiner—Richard J. Scanlan, Jr.
Attorney, Agent, or Firm—Roylance, Abrams, Berdo & Goodman

[57] ABSTRACT

A connector for male and female members, the connection being established by a stab-in action and being released by a rotational action. The connector includes a male member having an external helical groove, a female member having an internal helical groove, and a resilient helical coil received in the groove of one of the members and extending outwardly therefrom in the relaxed condition. The helical coil can have a circular or polygonal cross-section and has an end secured to the member carrying it to prevent gross displacement therebetween. The helical grooves in the male and female members having opposed, upwardly and inwardly tapering load-bearing surfaces receiving the helical coil therebetween in the connected condition. These tapering load-bearing surfaces can have the same or different angles of taper.

23 Claims, 23 Drawing Figures

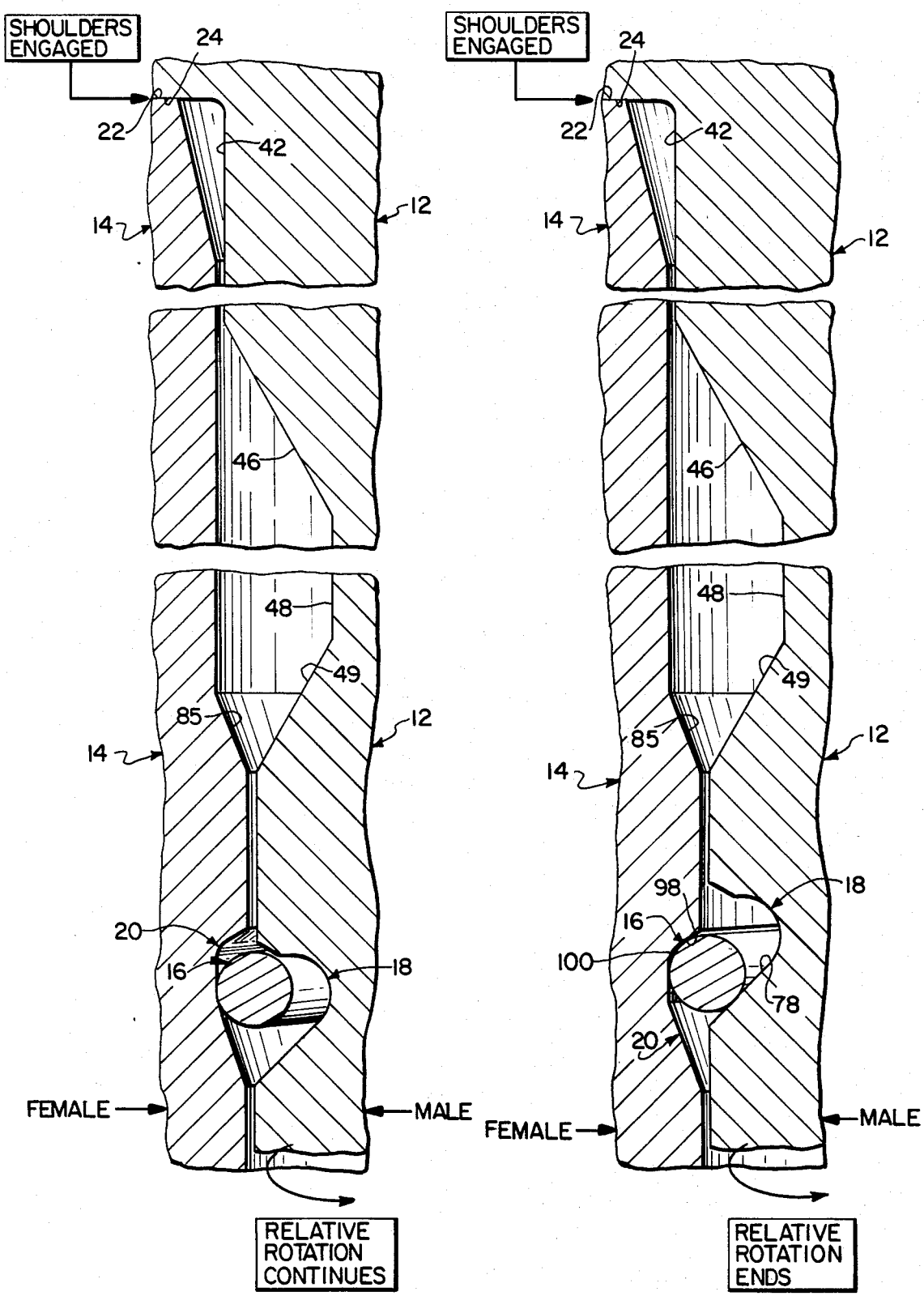

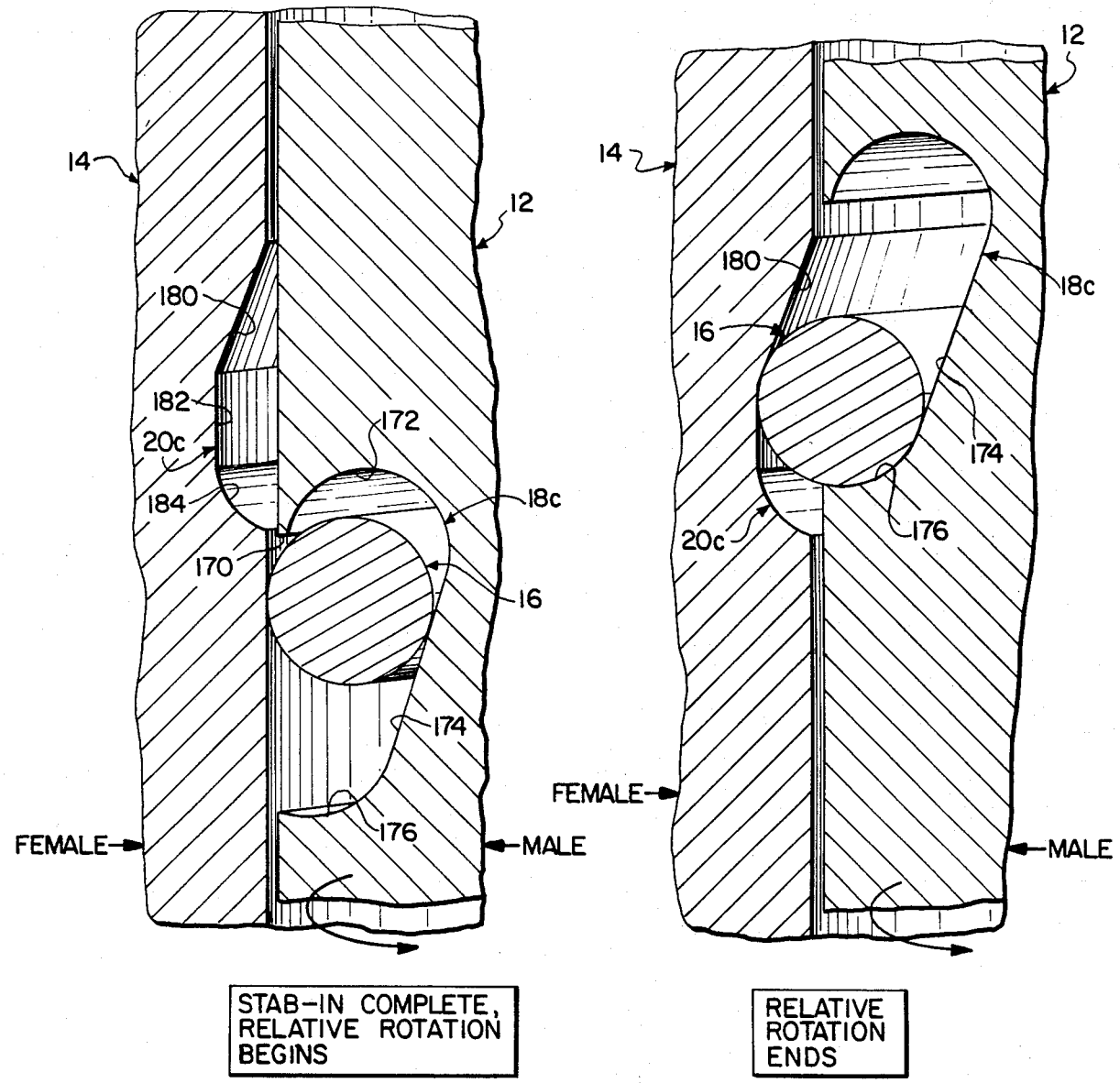

HELICAL COIL STAB-IN CONNECTOR

FIELD OF THE INVENTION

The invention relates to a releasable connector for male and female members, the connection being established by a stab-in action and being released by a rotational action. The connector includes a male member having an external helical groove, a female member having an internal helical groove, and a resilient helical coil received in the groove of one of the members and extending outwardly therefrom in the relaxed condition. The connector can be used to releasably couple, for example, lengths of pipe used in the exploration or production of oil and gas.

BACKGROUND OF THE INVENTION

There are literally hundreds of different ways to couple male and female members, a large number of them having been derived from research and development work relating to the exploration or production of oil and gas. This is because there is a constant requirement for coupling and uncoupling pipes. One of the most traditional connectors used in this environment is a simple threaded connection between a male and female member, with the threads being a continuous helix or of the interrupted, bayonette type. In addition, traditional connectors in this environment have included latches, segments and split rings which are moved radially to connect or disconnect the male and female members.

However, there are numerous disadvantages to these types of conventional connectors. Thus, the threaded type require a rotation and orientation to provide the connection. Others require multiple complicated movements between the male and female members to connect or disconnect them and some require a redressing or recocking before they can be reconnected once they are disconnected. Moreover, many of these conventional connectors require shear pins or shear sleeves which are broken upon connection, thereby preventing the connection from being repeated. Finally, many of these conventional connectors require very large wall thicknesses in the male and female members, when space is often restricted.

Examples of some of these prior art connectors are disclosed in the following U.S. Pat. Nos. 738,503 to Waters; 1,464,386 to Ingram; 1,820,644 to Bach; 1,891,460 to Vlahek; 2,346,051 to Seamark; 2,665,931 to Vegren; 2,777,718 to Vegren; 3,060,787 to Kraus et al; 3,105,556 to Raulins; and 4,003,401 to Haring.

SUMMARY OF THE INVENTION

Accordingly, it is a primary object of the invention to provide a connector for male and female members wherein the connection can be established by a simple stab-in action and released by a rotational action, all done remotely.

Another object is to provide such a connector that is inherently strong while requiring a minimum of wall thickness.

Another object of the invention is to provide such a connector that has no orientation requirement before the stab-in and is fully locked after the stab-in by a simple axial displacement between the male and female members or a relative rotation therebetween.

Another object of the invention is to provide such a connector that does not require redressing or recocking to reconnect two members and has no shear pins so it is repeatable.

Another object of the invention is to provide such a connector that can be sealed if desired.

The foregoing objects are attained by providing a connector assembly including a male member having an external helical groove, a female member having an internal helical groove, a resilient helical coil received in the groove of one of the members and in the relaxed state having a portion extending outwardly of the groove, the groove receiving the helical coil being of a depth substantially equal to the thickness of the helical coil material and the groove in the other member being of a depth less than the thickness of the helical coil material, the improvement comprising the helical groove in the female member having an upwardly and inwardly tapering helical load-bearing surface for engaging the helical coil and the helical groove in the male member having an upwardly and inwardly tapering helical load-bearing surface for engaging the helical coil.

Advantageously, the helical coil can have a circular or polygonal cross-section and has an end secured to the member carrying it to prevent gross displacement therebetween.

The opposed tapering load-bearing surfaces can be straight in cross-section and can have the same or different angles of taper.

Other objects, advantages and salient features of the present invention will become apparent from the following detailed description which, taken in conjunction with the annexed drawings, discloses preferred embodiments of the present invention.

DRAWINGS

Referring now to the drawings which form a part of this original disclosure:

FIG. 16 is a view similar to that shown in FIG. 15 except that relative rotation between the male and female members has occurred so that the helical grooves therein are aligned with the helical coil being located in each;

FIG. 17 is a view similar to that shown in FIG. 16 except that relative rotation between the male and female members has been completed and the helical coil is fully engaged between the opposed load-bearing surfaces on the male and female members in their respective helical grooves;

FIG. 22 is a fragmentary elevational view in section of a further modified helical groove configuration for the male and female members, this view showing stab-in completed and relative rotation to begin; and FIG. 23 is a view similar to that shown in FIG. 22 except that relative rotation between the male and female members has reached a point where the helical coil is engaged by the load-bearing surfaces of the helical grooves in the male and female members.

DETAILED DESCRIPTION

Figure 1:
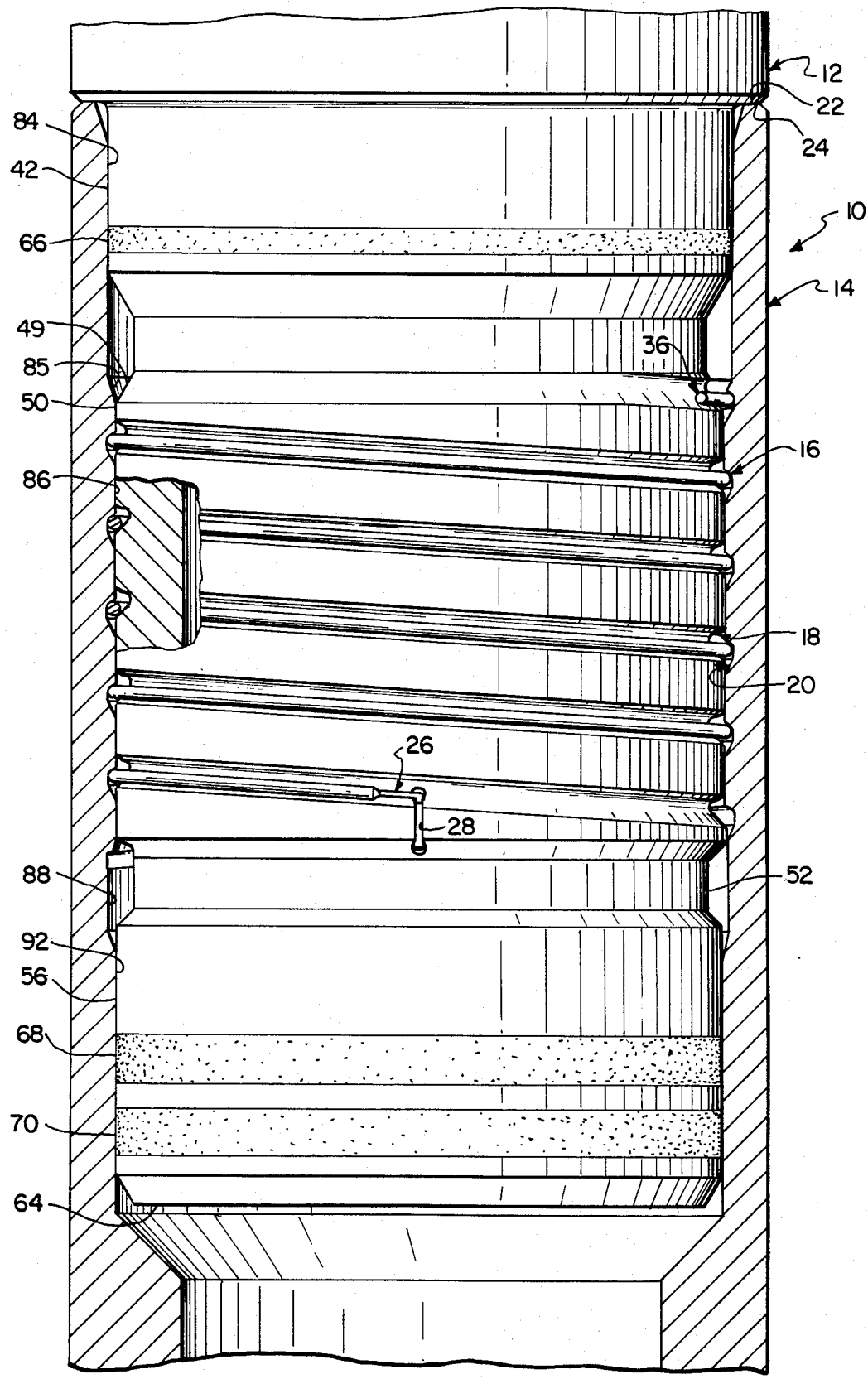
FIG. 1 is an elevational view with parts in vertical section showing the male member, the female member and the helical coil of the invention in a connected position.
Figure 2:
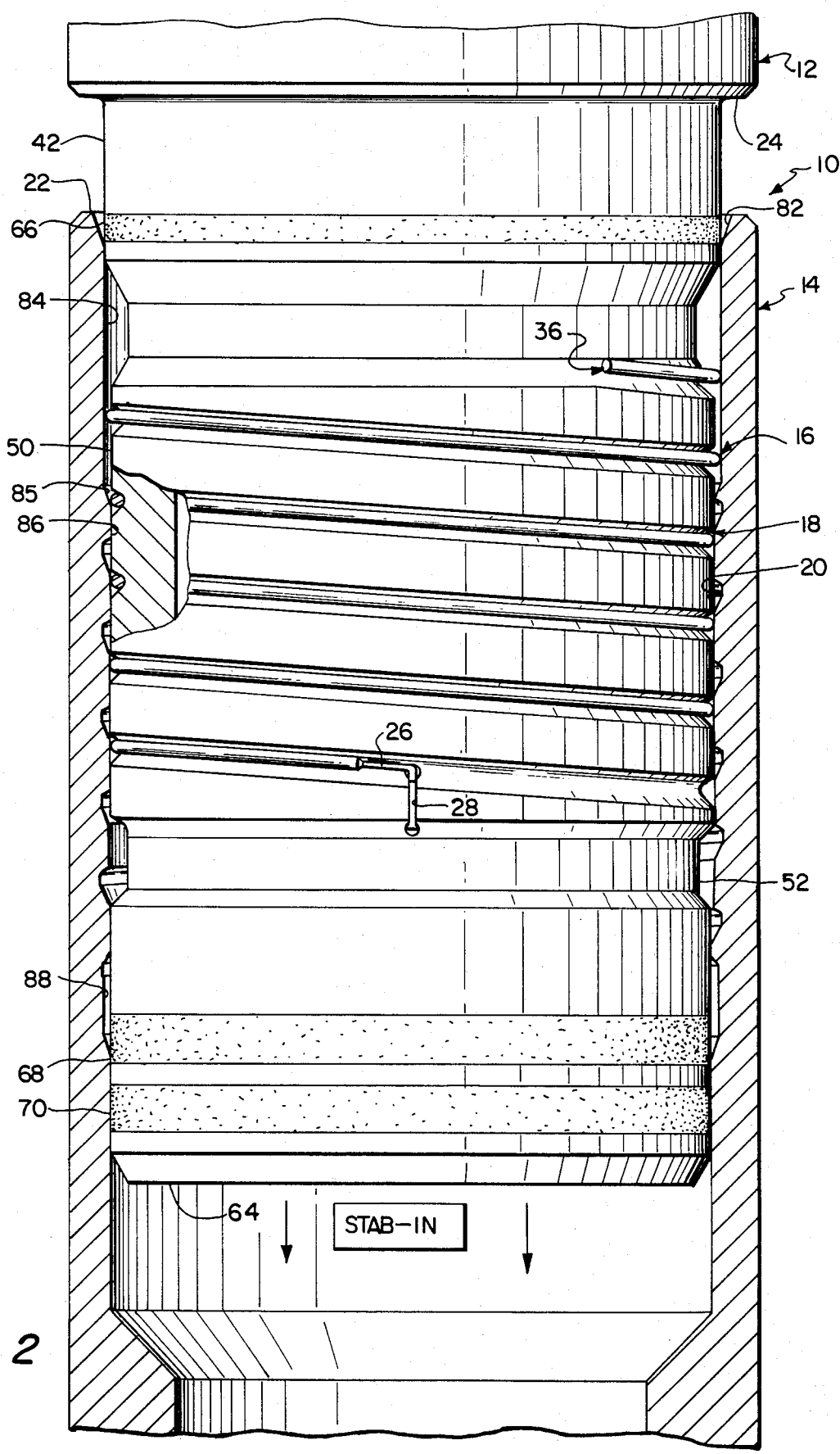
FIG. 2 is an elevational view similar to that shown in FIG. 1 except that the male member is being stabbed into the female member with the helical coil being received in the helical groove in the male member and jumping past the helical groove in the female member.

Referring now to FIGS. 1–17, the connector assembly 10 in accordance with the invention comprises a male member 12, a female member 14, and a helical coil 16 which is received in both a helical groove 18 in the male member and a helical groove 20 in the female member to connect these members together, as shown in FIG. 1. This connection is accomplished as shown in FIG. 2 by a simple stab-in of the male member into the female member. The female member has an upwardly facing annular shoulder 22 at its top and the male member has a downwardly facing annular shoulder 24 which engage, as shown in FIG. 1, when the stab-in is completed. During the stab-in, the helical coil is substantially fully received in the helical groove 18 in the male member and literally jumps into and then out of the helical groove 20 in the female member. Once the stab-in is completed, axial movement of the male member out of the female member will cause the helical coil to be received in both the helical grooves in the male and female members, to thereby connect these members together in tension. Alternatively, after the stab-in is completed, a simple relative rotation of the male and female members results in reception of the helical coil in the helical grooves of both members. To disconnect the two members, relative rotation opposite to the helical direction of the helical coil is all that is required. The helical coil will follow the male member during such relative rotation since an end 26 is received in a slot 28 in the male member, thereby preventing gross displacement therebetween.

THE HELICAL COIL

As shown in FIGS. 1–3 and 7, the helical coil 16 is simply a continuous helix which is flexible and resilient and has a pitch of approximately 5°. The pitch of the helical grooves on the male and female members is the same. The helical coil 16 has a uniform diameter, although it could be tapered, with the outer surface of the male member and the inner surface of the female member being correspondingly tapered. The material forming the helical coil is preferably metallic and it has a circular cross-section.

Figure 3:
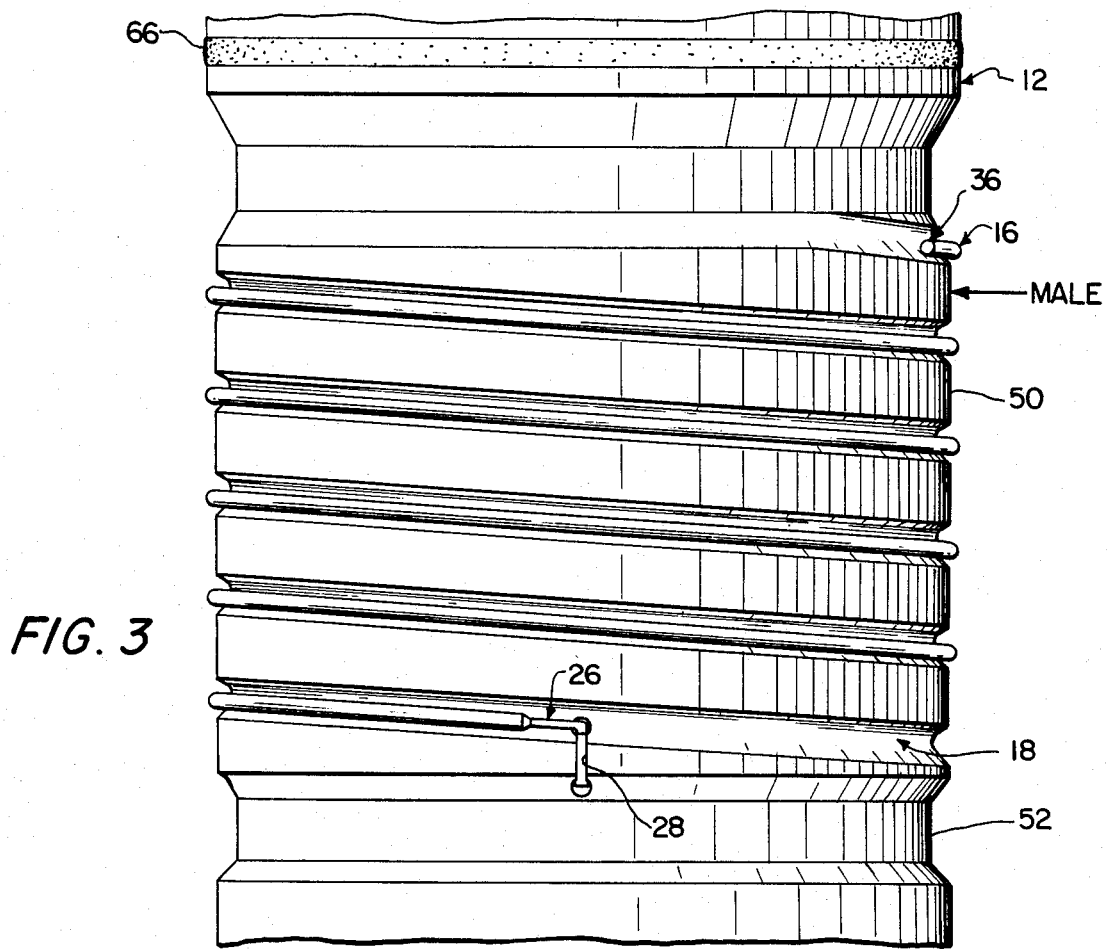
FIG. 3 is a fragmentary elevational view of the male member carrying the helical coil in the relaxed condition with the outer diameter of the coil extending past the outer diameter of the male member.
Figure 4:
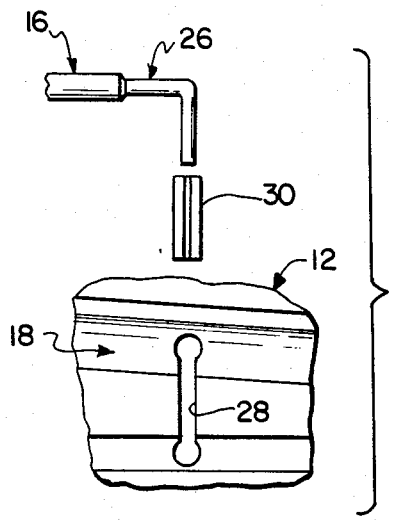
FIG. 4 is an enlarged exploded view of the helical coil and its connection to the male member to prevent gross displacement therebetween.
Figure 5:
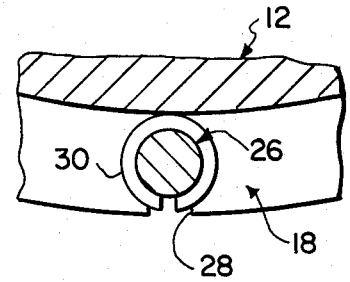
FIG. 5 is an enlarged top plan fragmentary view of an end of the helical coil received in a slot in the male member with a split roll pin interposed therebetween.

As seen in FIG. 3, the helical coil 16 is in its relaxed condition in which it is received in the helical groove 18 on the outer surface of the male member 12. In this condition, the inner diameter of the helical coil is smaller than the outer diameter of the male member but the outer diameter of the helical coil is greater than the outer diameter of the male member. Thus, the outer portion of the helical coil extends radially outwardly past the outer diameter of the male member. As seen in FIG. 2, the radial depth of the helical groove 18 in the male member is substantially as large as the diameter of the material forming the helical coil 16 so that the helical coil can be substantially fully received in the groove upon the stab-in motion, with the inner diameter of the female member camming the helical coil into the helical groove of the male member. The depth of groove 18 can be equal to or greater than the diameter of the material forming the coil, or it can be less than this diameter by an amount equal to the radial spacing between the outer diameter of the male member in the area of the male groove and the inner diameter of the female member in the area of the female groove.

As seen in FIGS. 1–3 and 7, the end 26 of the helical coil comprises a bent rod having a thickness somewhat less than the thickness of the coil material, this end being received in a vertical, cylindrical slot 28 in the male member. To prevent the end 26 from sliding out of slot 28, a split tube, known as a roll or spring pin, is interposed between the inner surface of the slot and the outer surface of end 26, as seen best in FIGS. 4 and 5. This connection prevents gross displacement between the helical coil and the male member, yet allows relative rotational movement between the end 26 and slot 28 as well as a slight relative axial movement. This connection allows the male member to be unthreaded relative to the female member with the helical coil following the male member and also aids in allowing relative movement of the helical coil and the helical groove in the male member, this movement having components along the longitudinal axis of the male member and radially of the male member during the stab-in action.

Figure 6:
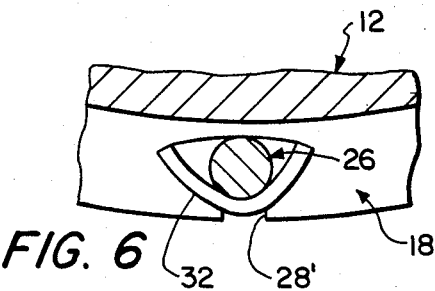
FIG. 6 is a top plan fragmentary view of a modified connection of the end of the helical coil to a slot in the male member, using a leaf spring.

A first alternative of this connection is shown in FIG. 6 where slot 28' has a substantially triangular cross-section and rather than using a split tube a leaf spring 32 is interposed between end 26 and the outer surface of the slot.

Figure 8:
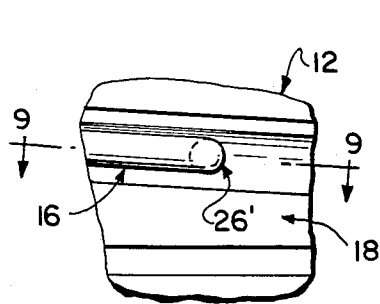
FIG. 8 is an enlarged elevational view of a further modified connection of an end of the helical coil to the male member to prevent gross displacement therebetween.
Figure 9:
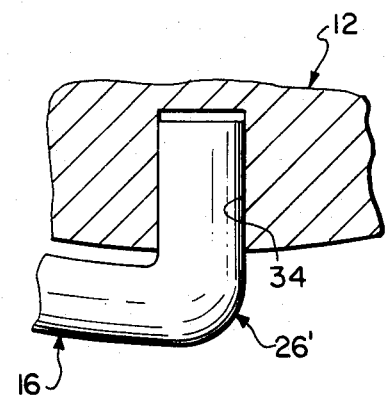
FIG. 9 is an enlarged top plan view in section taken along lines 9—9 in FIG. 8 showing the further modified connection of the coil to the male member.

A further alternative of this connection of the helical coil to the male member is shown in FIGS. 8 and 9 where an end 26' of the helical coil 16 is merely bent at approximately a 90° angle and is received in a radial bore 34 in the male member 12.

As seen in FIGS. 1-3 and 7, the other end 36 of the helical coil 16 is free of any connection with the male member. Thus, during the stab-in action, when the helical coil is radially compressed by the female member, as shown in FIG. 2, the coil is free to longitudinally extend as shown by comparing the position of end 36 in FIGS. 1 and 2.

THE MALE MEMBER

Figure 10:
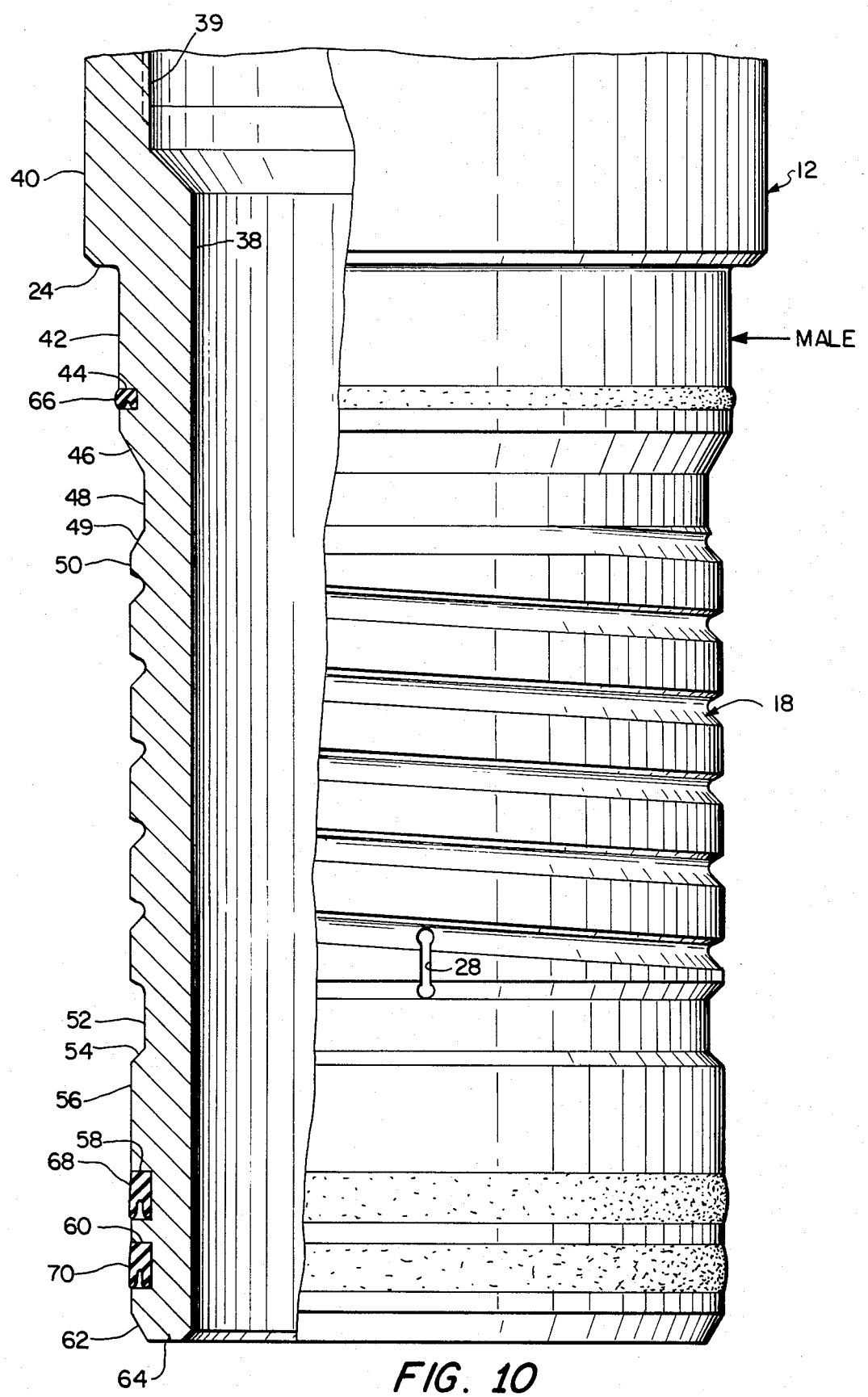
FIG. 10 is an elevational view with parts cut away and in section showing the male member without the helical coil received thereon.

As shown in FIG. 10, the male member 12 is illustrated without the helical coil connected thereto. This member is annular, has a through-bore 38 and internal threads 39 at its top to connect it to another member as desired. On the outer surface of the male member is a cylindrical surface 40, then the downwardly facing annular shoulder 24, a cylindrical surface 42 interrupted by an annular groove 44 having a rectangular cross-section, a downwardly and inwardly tapering frustoconical surface 46, a cylindrical surface 48, an upwardly and inwardly tapering frustoconical surface 49, a cylindrical surface 50 interrupted by the helical groove 18, a cylindrical surface 52, an upwardly and inwardly tapering frustoconical surface 54, a cylindrical surface 56 interrupted by two annular grooves 58 and 60 having rectangular cross-sections, a downwardly and inwardly tapering frustoconical surface 62 and a downwardly facing annular surface 64 at the end of the male member.

Received in annular groove 44 is a ring seal 66 and similarly received in annular grooves 58 and 60 are ring seals 68 and 70. These seals are expandable, having U-shaped cross-sections.

As best seen in FIG. 10, the helical groove 18 begins just below cylindrical surface 48 and frustoconical surface 49 and ends just above cylindrical surface 52, these surfaces forming thread relief areas for the apparatus for forming the helical groove.

As seen in FIGS. 1 and 2, as well as in FIG. 10, the outer diameter of cylindrical surface 50 is smaller than the outer diameter of cylindrical surface 42.

Figures 12, 13:
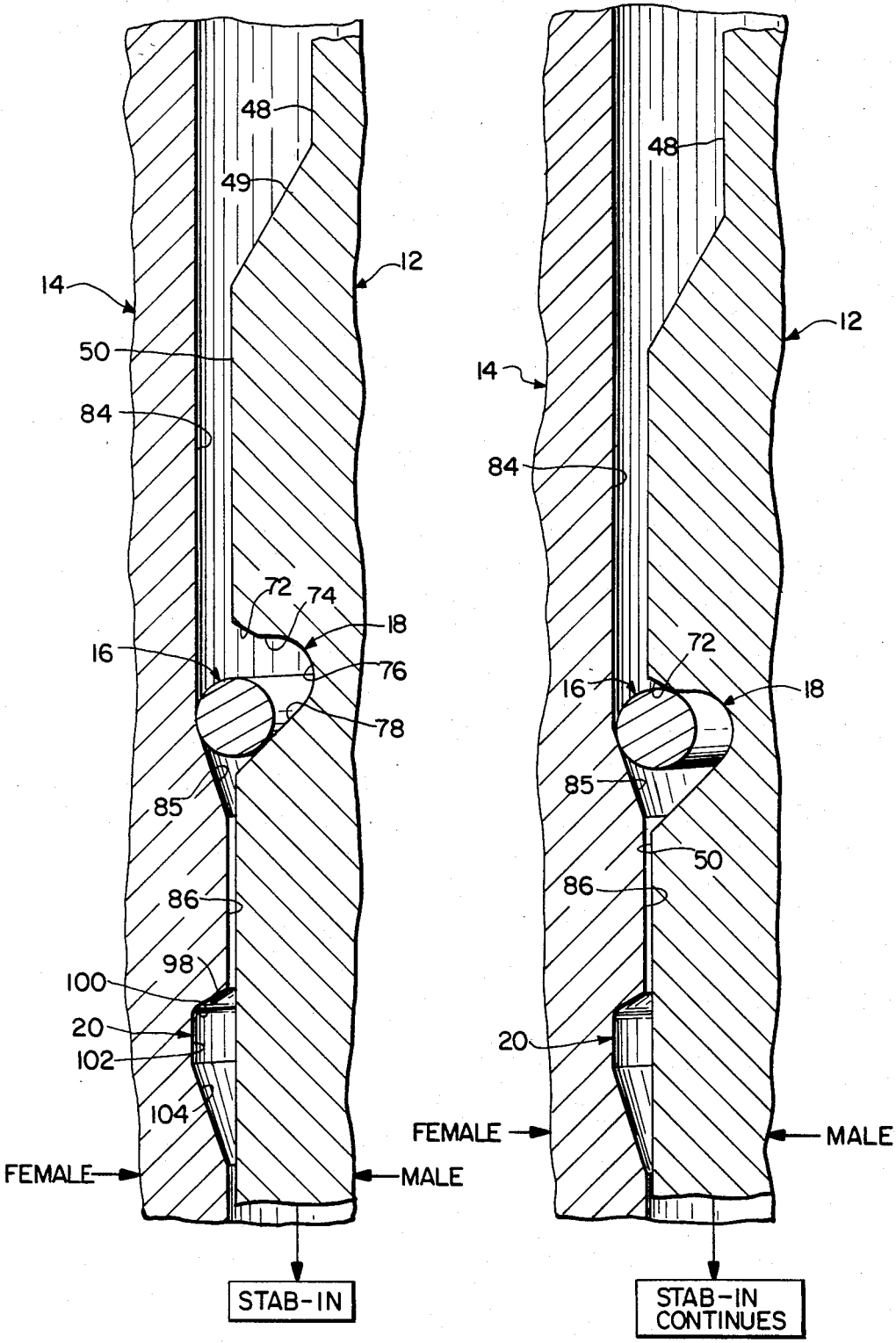
FIG. 12 is an enlarged fragmentary elevational view in section showing details of the groove configurations in the male and female members with the male member being stabbed-into the female member.
FIG. 13 is a view similar to that shown in FIG. 12 except that the male member has moved downwards so that the top of the groove therein engages the helical coil.
Figures 14, 15:
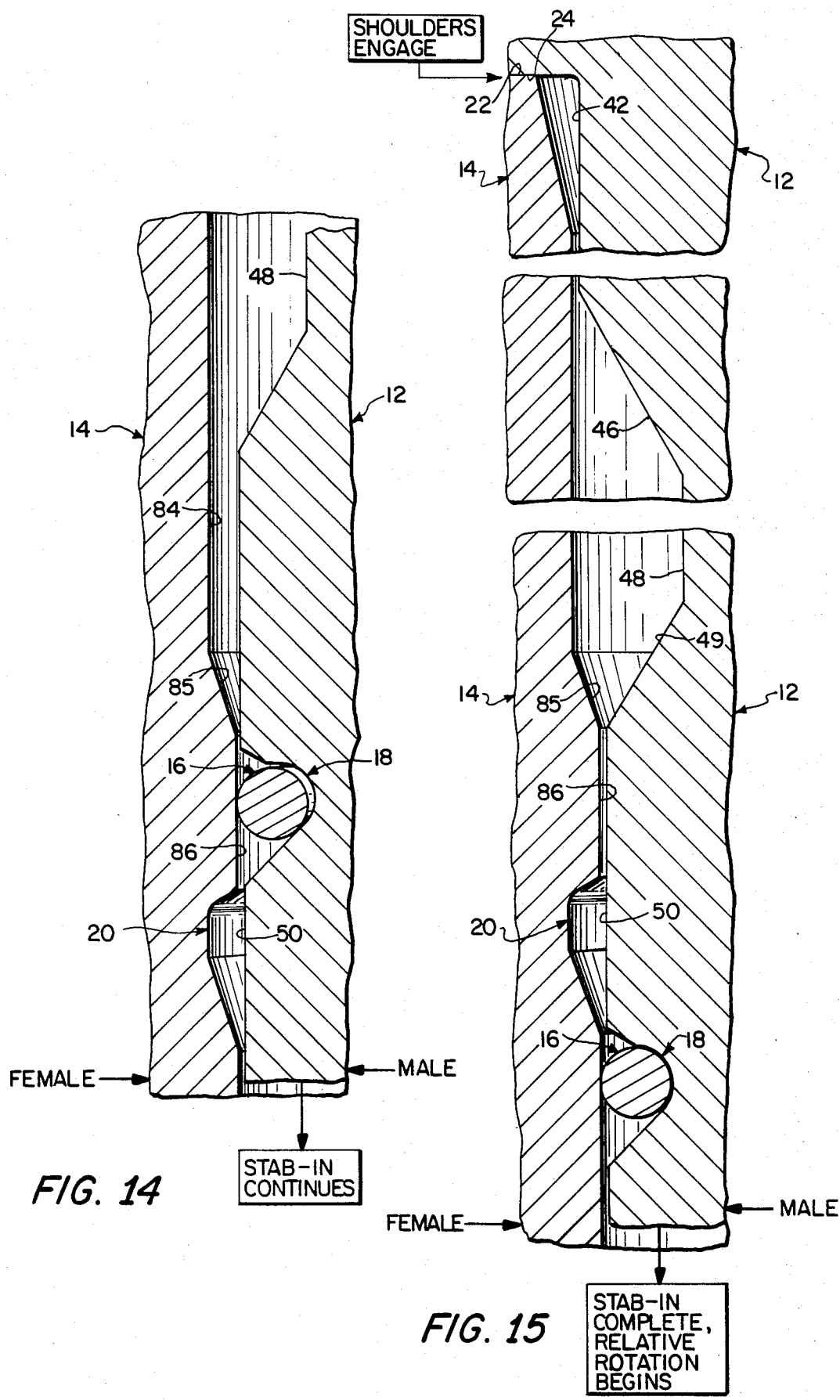
FIG. 14 is a view similar to that shown in FIG. 13 except that the male member has moved further downwards and the helical coil is biased inwardly by the inner diameter of the female member substantially completely into the helical groove in the male member, this also being shown in FIG. 2.
FIG. 15 is a view similar to that shown in FIG. 14 except that it also shows engaged shoulders of the male and female members and that the male member has moved further downwards so that the stab-in is complete, the helical coil having jumped into and then out of the helical groove in the female member.

The helical groove 18 on the male member 12 is shown enlarged in FIG. 12. This groove comprises a downwardly and inwardly tapering helical surface 72 extending inwardly from cylindrical surface 50 on the outside of the male member, a downwardly facing helical surface 74 extending radially inwardly from the bottom of helical surface 72, a curved helical surface 76 extending from surface 74 and facing generally radially outwardly of the male member, and an upwardly and inwardly tapering load-bearing helical surface 78 extending from surface 76 to cylindrical surface 50 on the exterior of the male member, the load-bearing helical surface 78 facing generally upwardly and radially outwardly. As seen in FIG. 12, the cross-sectional configurations of helical surfaces 72, 74 and 78 are straight while the cross-sectional configuration of helical surface 76 is curved with a radius of curvature substantially equal to the radius of the helical coil 16. The radial depth of groove 18 from the outer cylindrical surface 50 to the inner most point on helical surface 76 is substantially as large as the diameter of the helical coil 16 so that the coil can be substantially completely received therein, as best seen in FIGS. 14 and 15. Advantageously, helical surface 72 tapers from a horizontal plane at an angle of about 30° and helical surface 78 tapers from a horizontal plane at about 45°. The entire helical groove 18 has the same pitch as helical coil 16, which is approximately 5°. Both helical surfaces 74 and 78 are essentially in cross-section tangents of the curved helical surface 76.

THE FEMALE MEMBER

Figure 11:
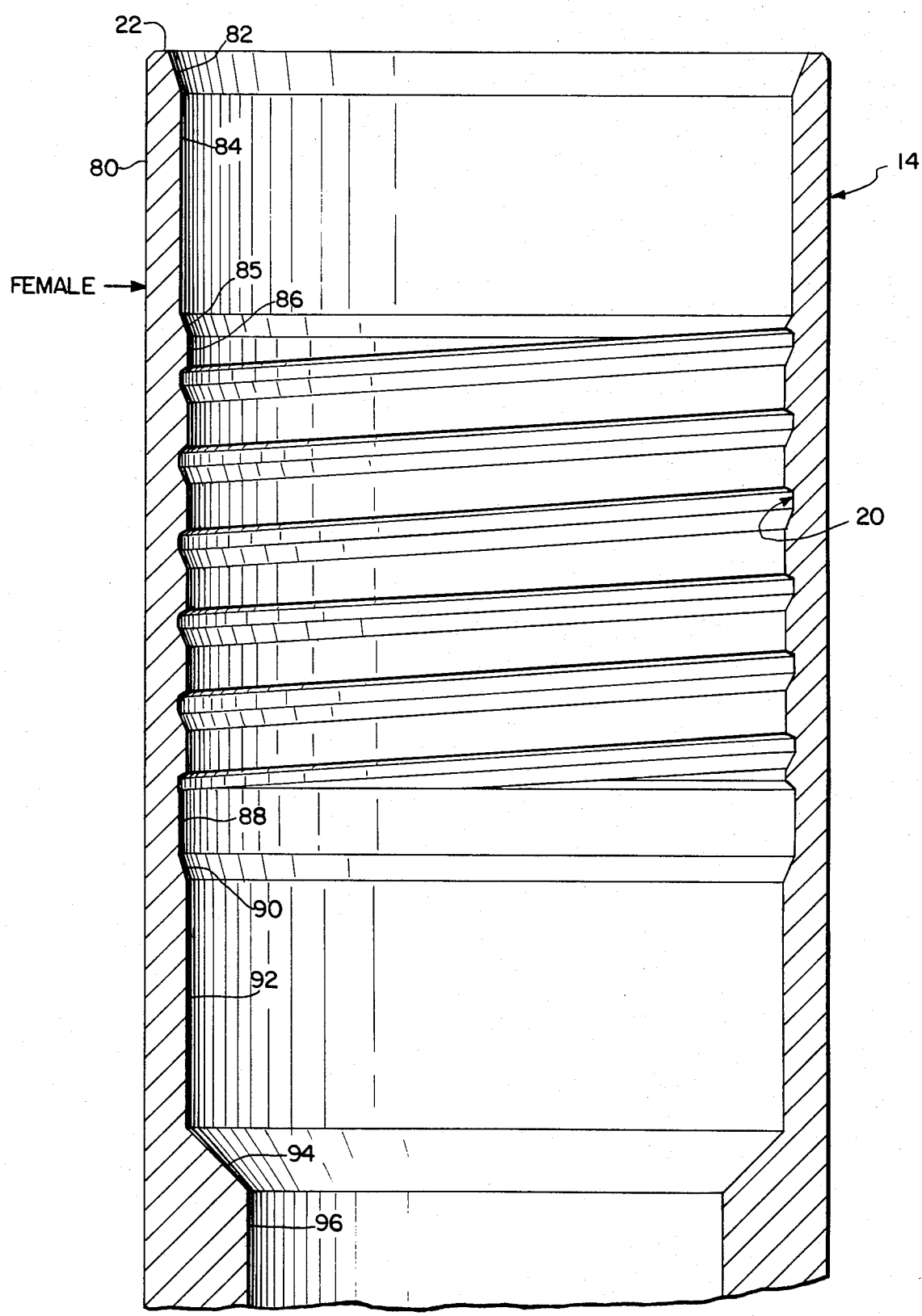
FIG. 11 is an elevational view in vertical section of the female member.

As seen best in FIG. 11, the female member 14 is annular and has the inwardly facing helical groove 20 on the interior surface thereof, this groove having substantially the same pitch as helical coil 16 and helical groove 18 in the male member. The depth of the helical groove 20 is equal to or slightly smaller than the radius of the material forming the helical coil. The female member has an outer cylindrical surface 80 and the upwardly facing annular shoulder 22 at the top. On the inside in descending order, the female member comprises a downwardly and inwardly tapering frustoconical surface 82, which tapers at an angle of about 20°, a cylindrical surface 84, a downwardly and inwardly tapering frustoconical surface 85, a cylindrical surface 86 having a slightly smaller diameter than cylindrical surface 84 and having the helical groove 20 defined therein, a cylindrical surface 88, a downwardly and inwardly tapering frustoconical surface 90, a cylindrical surface 92, a downwardly and inwardly tapering frustoconical surface 94, and a cylindrical surface 96.

As seen in FIG. 1 with the male member fully received in the female member, seal 66 on the male member seals against cylindrical surface 84 on the female member and seals 68 and 70 on the male member seal against cylindrical surface 92 on the female member. Thus, cylindrical surfaces 42 and 56 on the male member are slightly smaller than cylindrical surfaces 84 and 92 on the female member. In addition, cylindrical surface 50 which is interrupted to form the helical groove 18 on the male member is slightly smaller than the cylindrical surface 86 which is interrupted to form the helical groove 20 in the female member. Advantageously, the difference in the outer diameter of cylindrical surface 50 and the inner diameter of cylindrical surface 86 is about one-tenth the diameter of the material forming the helical coil 16.

Figure 7:
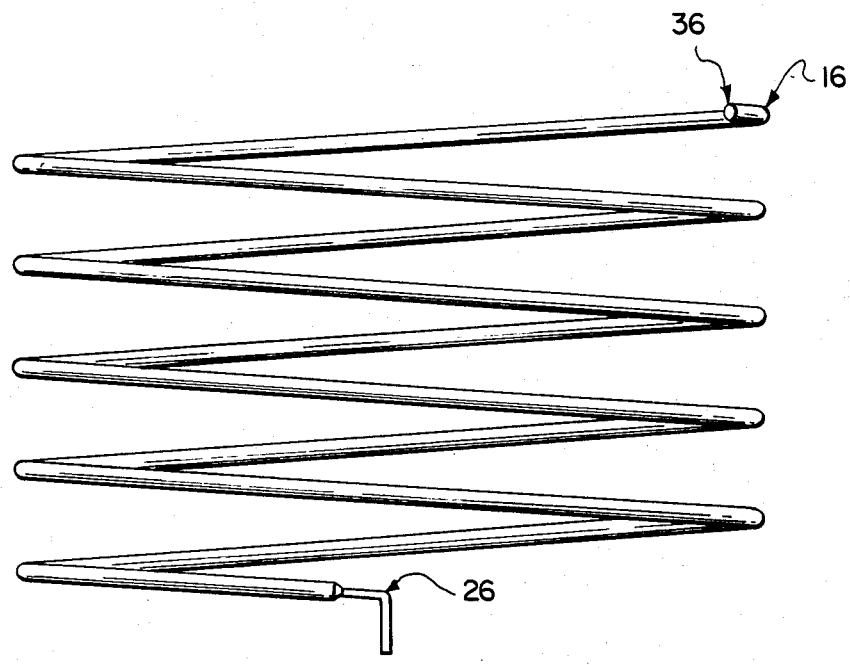
FIG. 7 is an elevational view of the helical coil in the relaxed condition.

As seen in FIG. 11, the helical groove 20 has about 5¼ turns while as seen in FIG. 7 the helical coil has about 4¾ turns. As seen in FIG. 10, the helical groove 18 has about 5½ turns.

As seen in FIG. 11, helical groove 20 begins substantially at the downwardly and inwardly tapering frustoconical surface 85 between cylindrical surfaces 84 and 86 and ends adjacent cylindrical surface 88.

The details of helical groove 20 in the female member are best seen in FIG. 12. This groove includes from the top an upwardly and inwardly tapering helical surface 98 which is downwardly and inwardly facing, a curved helical surface 100, a radially inwardly facing helical surface 102 and a downwardly and inwardly tapering helical surface 104 which is upwardly and inwardly facing. In cross-section, helical surfaces 98, 102 and 104 are straight while surface 100 is curved. Helical surface 98 is a load-bearing surface and tapers at an angle from the horizontal of about 30°, this angle of taper having a differential with the 45° angle taper of the load-bearing helical surface 78 on the male member, and thus, these tapering surfaces converge, as best seen in FIG. 17. It is advantageous to have these surfaces with such a differential taper since it assures that the helical coil 16 will not be pulled out of the helical groove 20 in the female member once the two members are connected and experience axial tension forces. However, the desired locking engagement of the helical coil between the two helical grooves in the male and female members would be accomplished even if the two load-bearing surfaces had the same taper.

As seen in FIG. 17, the radius of curvature of helical surface 100 is slightly smaller than the radius of the helical coil 16. CL OPERATION In connecting the male and female members, the helical coil 16 is received on the male member as shown in FIG. 3. With the outer surface of the helical coil extending outwardly from the male member, the male member is stabbed-into the female member as shown in FIG. 2. As the male members proceeds into the female member, frustoconical surfaces 82 and 85 on the female member bias the helical coil inwardly so that the portion of the coil below frustoconical surface 85 is substantially completely received in helical groove 18 in the male member, as seen in FIG. 2. This also tends to extend the helical coil in a longitudinal direction as shown by comparing end 36 of the helical coil in FIGS. 3 and 2. As continued axial movement of the male member into the female member continues, the helical coil, if oriented exactly with the helical groove 20 in the female member, expands into and then jumps out of this helical groove. In all events, this relative longitudinal movement continues until the downwardly facing shoulder 24 on the male member engages the upwardly facing shoulder 22 on the female member, as seen in FIGS. 1 and 2. Once the stab-in is completed, there are two ways to connect the male member to the female member. The first way is to pull the male member outwardly of the female member until the helical groove in the female member aligns with the helical coil, at which time the outwardly biased helical coil will move radially outwardly into the helical groove in the female member. Then, the load-bearing helical surface 78 on the male member and 98 on the female member will engage the helical coil therebetween, as shown in FIG. 17. This engagement will prevent further longitudinal outward movement of the male member from the female member. The second way to lock the male and female members together is to, after a complete stab-in is completed, rotate the male member relative to the female member in the same or opposite direction as the sense of the helical coil. This rotation is continued, for one turn or less until the helical coil is oriented with the helical groove in the female member at which time the coil expands radially outwardly into the helical groove and further rotation brings the load-bearing surfaces 78 and 98 into an engagement with the helical coil, thereby preventing removal of the male member from the female member by means of a longitudinal pulling action.

To disconnect the male member from the female member, the male member is rotated relative to the female member in a direction counter to the sense of the helical coil. Since the helical coil is connected to the male member, it travels rotationally with the male member and is unthreaded from the helical groove in the female member.

Referring now to FIGS. 12–17, the action of the helical coil and helical grooves is shown in clear detail. Thus, as the stab-in proceeds as shown in FIGS. 2 and 12, the helical coil 16 will be biased inwardly of the male member by means of frustoconical surface 85 on the female member. As the stab-in continues, helical surface 72 on the male member helical groove comes into contact with the helical coil as shown in FIG. 13. Upon further stab-in movement, the helical coil 16 is biased substantially completely into the helical groove 18 in the male member as shown in FIG. 14. As seen in FIG. 14, cylindrical surface 86 on the female member keeps the helical coil in helical groove 18 in the male member. The stab-in is continued until the shoulders 24 and 22, as shown in FIG. 15, engage. At this time, the relative rotation can begin to bring the helical grooves in the male and female members into alignment with the helical coil therebetween. This is shown in FIG. 16 with the relative rotation proceeding in the same direction as the sense of the helical coil. The relative rotation continues and then ends as shown in FIG. 17 when the load-bearing surfaces 78 and 98 engage the helical coil 16 therebetween. During rotation, as shown in FIGS. 15–17, shoulders 22 and 24 remain engaged.

Figures 18, 19:
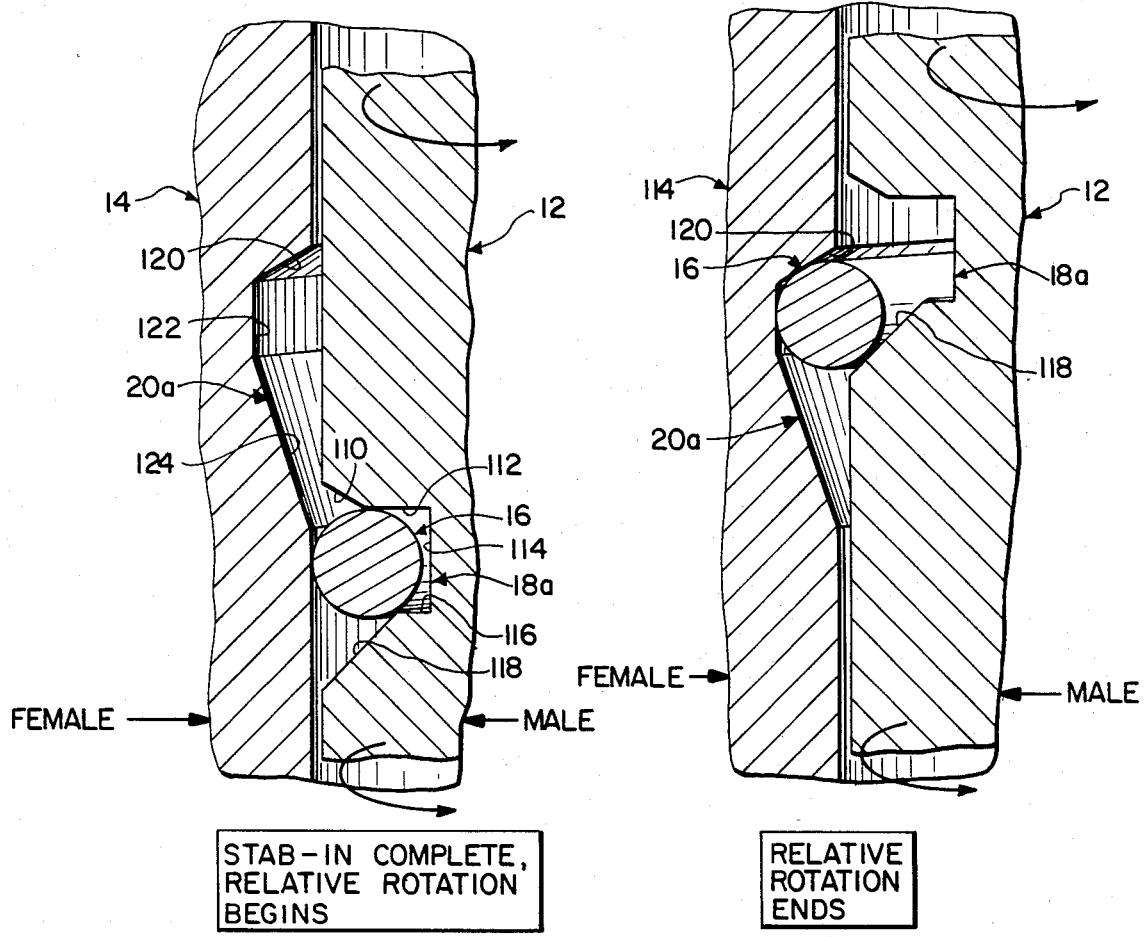
FIG. 18 is a fragmentary elevational view in section of modified helical grooves in both the male and female members, the stab-in of the male member into the female member having been completed.
FIG. 19 is a view similar to that shown in FIG. 18 except that relative rotation between the male and female members has been completed so that the helical coil engages both the load-bearing surfaces in the male and female member helical grooves.

EMBODIMENT OF FIGS. 18 and 19

A modified groove configuration for both the helical groove in the male member and the helical groove in the female member are illustrated in FIGS. 18 and 19, with the configuration of the helical coil remaining the same as shown in FIGS. 1–17.

In this embodiment, helical groove 18*a* in the male member 12 comprises from the top a downwardly and inwardly tapering helical surface 110, a downwardly facing helical surface 112, a radially outwardly facing helical surface 114, an upwardly facing helical surface 116, and an upwardly and inwardly tapering helical surface 118. All of the surfaces are straight in cross-section with surface 118 being a load-bearing surface and extending at an angle of about 45°. This surface faces generally upwardly and outwardly of the male member. The space between helical surfaces 112 and 116 is slightly greater than the diameter of the material forming the helical coil 16 and the total depth of the groove 18*a* from helical surface 114 to the outer surface of the male member is substantially as large as the diameter of the material forming the coil.

The groove 20*a* in the female member 14 comprises from the top to the bottom an upwardly and inwardly tapering helical surface 120 which is downwardly and inwardly facing, an inwardly facing helical surface 122 and a downwardly and inwardly tapering helical surface 124 which is upwardly and inwardly facing. In cross-section all of these helical surfaces are straight with helical surface 120 forming a load-bearing surface and extending at an angle of about 30°.

This embodiment operates in the same fashion as that described above regarding FIGS. 1–17, with the depth of the groove 20a being less than the radius of the material forming the helical coil 16 and with the helical coil extending out of helical groove 18a in the male member in the relaxed condition. In FIG. 18, a stab-in of the male member 12 relative to the female member 14 is complete and relative rotation can begin. This rotation ends with the helical coil 16 engaging the load-bearing surfaces 118 and 120 as shown in FIG. 19.

EMBODIMENT OF FIGS. 20 AND 21

Figure 21:
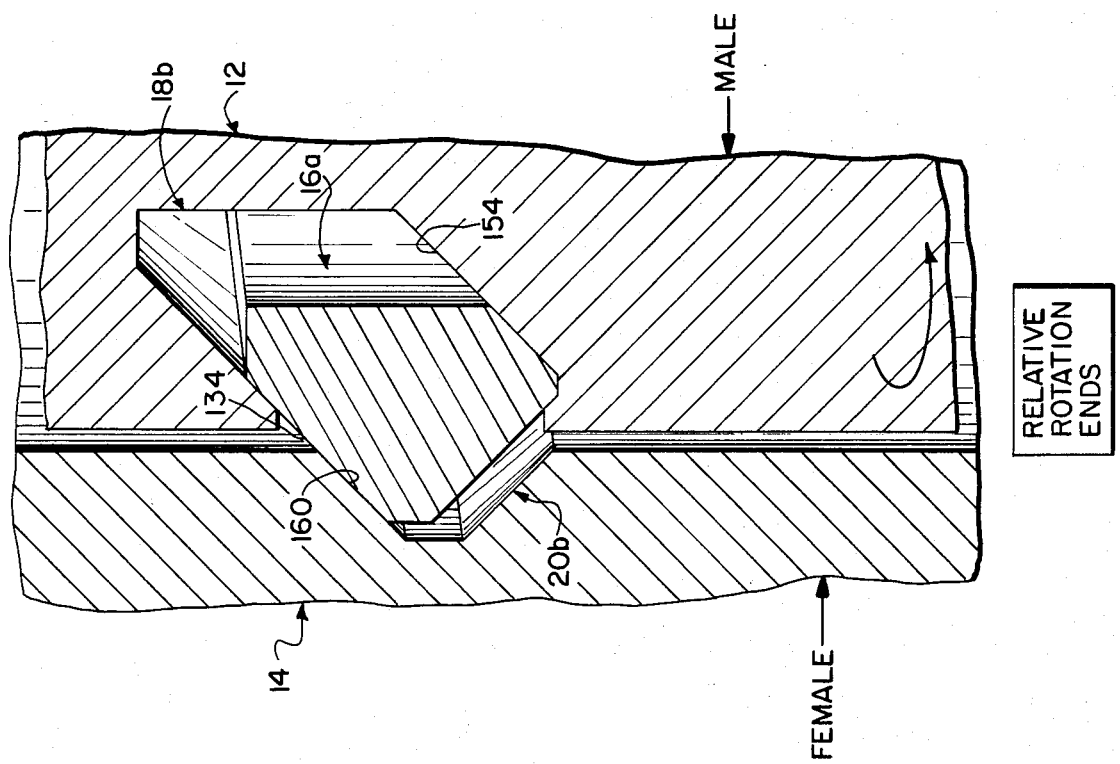
FIG. 21 is a view similar to that shown in FIG. 20 except that relative rotation has reached a point where the helical coil is engaged between the load-bearing surfaces on the helical grooves in the male and female members.
Figure 20:
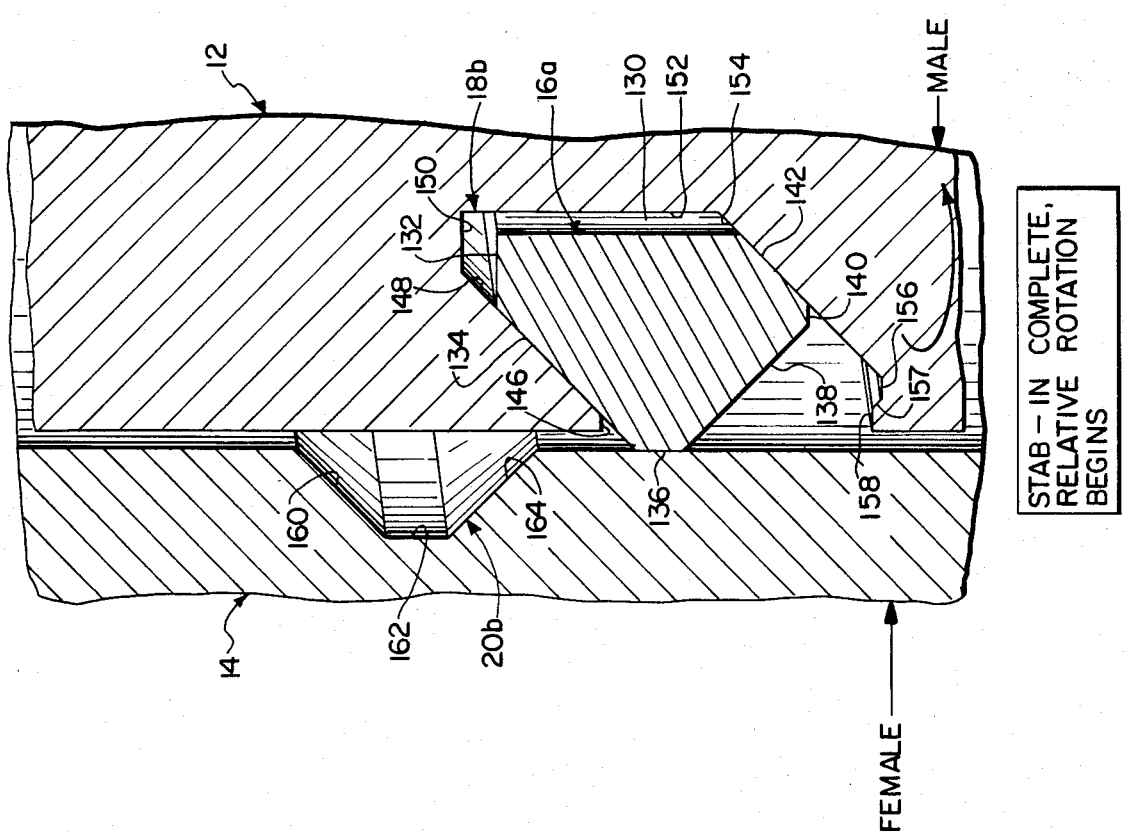
FIG. 20 is a fragmentary elevational view in section of a further modified helical groove configuration for the male and female members and a modified cross-section for the helical coil, this view showing stab-in completed and relative rotation to begin.

A further modified embodiment of the invention is shown in FIGS. 20 and 21 with different helical groove configurations for both the male and female members and with a different cross-sectional configuration of the helical coil.

The coil 16a has a cross-section which is an irregular polygon and includes an inwardly facing helical surface 130, an upwardly facing helical surface 132, an upwardly and inwardly tapering helical surface 134 which is upwardly and outwardly facing, an outwardly facing helical surface 136, a downwardly and inwardly tapering helical surface 138 which is downwardly and outwardly facing, a downwardly facing helical surface 140 and an upwardly and inwardly tapering helical surface 142 which is downwardly and inwardly facing. All of these surfaces in cross-section are straight with surfaces 132 and 140 being parallel to each other, surfaces 130 and 136 being parallel to each other and surfaces 134 and 142 being parallel to each other. Surfaces 142 and 134 extend at an angle to a horizontal plane of about 45°, these surfaces being load-bearing surfaces.

The helical groove 18b in the male member 12 comprises a downwardly facing helical surface 146, an upwardly and inwardly tapering helical surface 148 which is downwardly and inwardly facing, a downwardly facing helical surface 150, an outwardly facing helical surface 152, an upwardly and inwardly tapering helical surface 154 which is upwardly and outwardly facing, an upwardly facing helical surface 156, a downwardly and inwardly tapering helical surface 157 which is upwardly and inwardly facing, and an upwardly facing helical surface 158. All of these surfaces in cross-section are straight with surfaces 146, 150, 156, and 158 being parallel to one another and with surfaces 148 and 154 being parallel to one another. Surface 154 is a load-bearing surface and both it and surface 148 extend at a tapering angle of about 45°. These surfaces 154 and 148 slidably engage respectively helical surfaces 142 and 134 on the helical coil 16a. Surface 152 extends generally axially in cross-section of the male member 12 as do surfaces 130 and 136 on the helical coil 16a. The radial depth of groove 18b is substantially as large as the radial width of coil 16a between surfaces 130 and 136.

The helical groove 20b in the female member 14 comprises from the top an upwardly and inwardly tapering helical surface 160 which is downwardly and inwardly facing and which is a load-bearing surface, an inwardly facing helical surface 162, and a downwardly and inwardly tapering helical surface 164 which is upwardly and inwardly facing. Each of these surfaces in cross-section is straight with surface 160 extending at a tapering angle of about 45°. Thus, surfaces 154 and 160 are parallel although they could converge slightly if desired. The depth of groove 20b from the inner surface of female member 14 to helical surface 162 is less than the radial width of the helical coil 16a.

The operation of the grooves and coil shown in FIGS. 20 and 21 is substantially the same as that described above regarding FIGS. 1–17. In FIG. 20, the stab-in of the male member 12 into the female member 14 has been completed and the helical coil 16a is biased into groove 18b of the male member by means of the inner surface of the female member. Upon relative rotation of the male and female members, the helical coil 16a comes into a load-bearing engagement between surfaces 154 and 160 on the male and female members as shown in FIG. 21.

EMBODIMENT OF FIGS. 22 AND 23

A further embodiment of the invention is shown in FIGS. 22 and 23 where the helical coil 16 is the same as that shown in FIGS. 1–17 but the configurations of the helical grooves in the male and female members are different.

The helical groove 18c in the male member 12 comprises a downwardly facing helical surface 170, a generally downwardly and inwardly facing curved helical surface 172, an upwardly and inwardly tapering helical surface 174 which is upwardly and outwardly facing and an upwardly and outwarding facing curved helical surface 176. Both surfaces 174 and 176 are load-bearing and curved surface 172 has a radius of curvature substantially equal to the radius of the helical coil 16. Surface 174 is straight in cross-section and tapers at an angle of approximately 15°. The radial depth of groove 18c is larger than the diameter of helical coil 16.

The helical groove 20c in the female member 14 comprises an upwardly and inwardly tapering helical surface 180 which is load-bearing and which is downwardly and inwardly facing, an inwardly facing helical surface 182 and a curved upwardly and inwardly facing helical surface 184. Surfaces 180 and 182 in cross-section are straight with surface 180 tapering at an angle of about 15°. Thus, load-bearing surfaces 180 on the female member and 174 on the male member are essentially parallel, although they could have a differential taper leading them to converge as shown and described above regarding load-bearing surfaces 98 and 78 in FIGS. 1–17. The depth of helical groove 20c between the inner surface of the female member and helical surface 182 is less than the radius of the helical coil material.

This embodiment operates in a manner similar to that shown and described above regarding FIGS. 1–17 with FIG. 22 showing the stab-in of the male member into the female member in a completed condition with relative rotation to begin. This rotation is completed as shown in FIG. 23 with the helical coil 16 engaging load-bearing surfaces 174 and 176 on the male member and surface 180 on the female member.

While advantageous embodiments have been chosen to illustrate the invention, it will be understood by those skilled in the art that various changes and modifications can be made therein without departing from the scope of the invention as defined in the appended claims. For example, the helical coil could be carried by the female member with a reversal of the groove configurations shown in FIGS. 1–17. In addition, the pitch, diameter and number of turns in the helical coil can be varied depending upon space requirements.

What is claimed is:

1. In a connector assembly including a male member having an external helical groove, a female member having an internal helical groove, and a resilient helical coil received in the groove of one of the members and in the relaxed state having a portion extending outwardly of the groove, the groove receiving the helical coil being of a depth substantially equal to the thickness of the helical coil material and the groove in the other member being of a depth less than the thickness of the helical coil material, the improvement comprising:

said helical groove in said female member having an upwardly and inwardly tapering helical load-bearing surface for engaging said helical coil; and said helical groove in said male member having an upwardly and inwardly tapering helical load-bearing surface for engaging said helical coil, said upwardly and inwardly tapering helical load-bearing surface in said male member being straight in vertical cross-section, said upwardly and inwardly tapering helical load-bearing surface in said female member being straight in vertical cross-section.

2. A connector assembly according to claim 1, wherein
said helical groove in said male member receives said helical coil and has a generally downwardly facing helical surface.

3. A connector assembly according to claim 2, wherein
said helical groove in said female member has a generally upwardly and inwardly facing helical surface.

4. A connector assembly according to claim 3, wherein
said helical groove in said male member has a generally radially outwardly facing helical surface.

5. A connector assembly according to claim 4, wherein
said helical groove in said female member has a generally radially inwardly facing helical surface.

6. A connector assembly according to claim 3, wherein
said generally upwardly and inwardly facing helical surface in said female member is straight in vertical cross-section.

7. A connector assembly according to claim 3, wherein
said generally upwardly and inwardly facing helical surface in said female member is curved in vertical cross-section.

8. A connector assembly according to claim 1, wherein
said helical coil is circular in cross-section.

9. A connector assembly according to claim 1, wherein
said helical coil is an irregular polygon in cross-section.

10. A connector assembly according to claim 1 and further comprising
means, coupled to said male member and to said helical coil, for preventing relative gross displacement between said helical coil and said male member.

11. A connector assembly according to claim 10, wherein
said means is coupled to said helical coil at the lowermost end of said helical coil.

12. A connector assembly according to claim 11, wherein
said means allows said helical coil lowermost end to pivot relative to said male member.

13. A connector assembly according to claim 10, wherein
said means allows said helical coil lowermost end to move axially of said male member.

14. A connector assembly according to claim 10, wherein
said means comprises an opening in said male member and a portion of said helical coil received in said opening.

15. A connector assembly according to claim 14, wherein
said opening extends longitudinally of said male member.

16. A connector assembly according to claim 14, wherein
said opening extends radially of said male member.

17. A connector assembly according to claim 14, wherein
said opening is a slot, and
further comprising a split tube interposed between the inside of said slot and the outside of said portion of said helical coil received in said opening.

18. A connector assembly according to claim 14, wherein
said opening is a slot, and
further comprising a leaf spring interposed between the opening in said slot and said portion of said helical coil received in said opening.

19. A connector assembly according to claim 1, wherein
said straight vertical cross-sections of said upwardly and inwardly tapering helical load-bearing surfaces in said male and female members are parallel.

20. A connector assembly according to claim 1, wherein
said straight vertical cross-sections of said upwardly and inwardly tapering helical load-bearing surfaces in said male and female members taper inwardly relative to one another in the radially inward direction.

21. A releasable connector assembly, the combination comprising:
an annular female member having a stop shoulder at an end thereof and a radially inwardly facing helical groove;

a male member having an outwardly facing helical groove and a stop shoulder, said stop shoulders on said male and female members adapted to engage one another upon full insertion of said male member into said female member, said helical grooves on said male and female members having the same pitch;

a resilient helical coil received in said helical groove in said male member for movement which has components along the longitudinal axis of said male member and radially of said male member and adapted to be received in said helical groove in said female member upon full insertion of said male member into said female member and relative rotation therebetween; and means, coupled to said male member and to said helical coil, for preventing relative gross displacement between said helical coil and said male member while allowing relative movement of said helical coil along the longitudinal axis and radially of said male member, said helical groove in said female member having an upwardly and inwardly tapering helical load-bearing surface, a downwardly and inwardly tapering helical surface, and a radially inwardly facing helical surface therebetween, said helical groove in said male member having a downwardly and inwardly tapering helical surface, an upwardly and inwardly tapering helical load-bearing surface, and a radially outwardly facing helical surface therebetween, said helical coil having a relaxed outer diameter greater than the outer diameter of said male member helical groove but a relaxed inner diameter less than the outer diameter of said male member helical groove, said helical groove in said male member having a depth substantially equal to the thickness of said helical coil so that said helical coil can be substantially completely received in said helical groove in said male member, said helical coil adapted to contact both said load-bearing surface on said female member and said load-bearing surface on said male member upon full insertion of said male member into said female member and relative rotation therebetween, thereby connecting said members together and preventing disconnection under axial tension forces while allowing disconnection by means of rotation of said male member relative to said female member, said upwardly and inwardly tapering helical load-bearing surface in said male member being straight in vertical cross-section, said upwardly and inwardly tapering helical load-bearing surface in said female member being straight in vertical cross-section.

22. A connector assembly according to claim 21, wherein said straight vertical cross-sections of said upwardly and inwardly tapering helical load-bearing surfaces in said male and female members are parallel.

23. A connector assembly according to claim 21, wherein said straight vertical cross-sections of said upwardly and inwardly tapering helical load-bearing surfaces in said male and female members taper inwardly relative to one another in the radially inward direction.

* * * * *